United States Patent
Shahindoust et al.

(10) Patent No.: US 7,864,354 B2
(45) Date of Patent: Jan. 4, 2011

(54) SYSTEM AND METHOD FOR CONTROLLED MONITORING OF PENDING DOCUMENT PROCESSING OPERATIONS

(75) Inventors: Amir Shahindoust, Laguna Niguel, CA (US); Peter Tran, Garden Grove, CA (US); Sameer Yami, Irvine, CA (US); Michael Yeung, Mission Viejo, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1070 days.

(21) Appl. No.: 11/450,223

(22) Filed: Jun. 9, 2006

(65) Prior Publication Data

US 2007/0285674 A1 Dec. 13, 2007

(51) Int. Cl.
*G06F 3/12* (2006.01)
*G06K 15/00* (2006.01)

(52) U.S. Cl. .................... 358/1.15; 358/1.14
(58) Field of Classification Search ........... 358/1.14, 358/1.15
See application file for complete search history.

(56) References Cited

U.S. PATENT DOCUMENTS

| | | | | |
|---|---|---|---|---|
| 5,638,511 | A * | 6/1997 | Nezu | 726/5 |
| 2001/0012122 | A1* | 8/2001 | Ueda | 358/1.15 |
| 2003/0103081 | A1* | 6/2003 | Ebuchi | 345/764 |
| 2003/0137690 | A1* | 7/2003 | Hoover et al. | 358/1.15 |
| 2003/0182579 | A1* | 9/2003 | Leporini et al. | 713/201 |
| 2004/0088378 | A1* | 5/2004 | Moats | 709/219 |

* cited by examiner

*Primary Examiner*—Benny Q Tieu
*Assistant Examiner*—Eric A Rust
(74) *Attorney, Agent, or Firm*—SoCal IP Law Group LLP; Steven C. Sereboff; Jonathan Pearce

(57) ABSTRACT

A system and method for controlled monitoring of pending document processing operations is provided. Each document processing request received by a document processing device is assigned a job name, which is then encrypted using a random static encryption key, resulting in a job identification. A user then logs onto the document processing device to view pending jobs, which are displayed to the user by only job identification. Those jobs with which the user is associated are then decrypted by the document processing device, allowing the user to view job information including status and file name. The user is thereby also able to modify or delete those pending jobs with which the user is associated. Once the job queue is empty, the random static encryption key is deleted and a new key is generated when a document processing request is received into the empty queue.

23 Claims, 5 Drawing Sheets

SYSTEM AND METHOD FOR CONTROLLED MONITORING OF PENDING DOCUMENT PROCESSING OPERATIONS

BACKGROUND OF THE INVENTION

The subject application is directed to a system and method for controlled monitoring of pending document processing operations. In particular, the subject application is directed to a system and method for secure and confidential queue management.

Current multi-functional peripheral devices or document processing devices allow any user to view the list of pending document processing operations. Viewing of document processing queues allows a user to know their relative position, and thus gauge the wait time until processing will be commenced or completed. Also, a user may choose to view, release, hold, or delete pending jobs from a queue, or mark a job for additional copies to be made. This poses a problem if a user has transmitted a job containing sensitive or confidential information, such as financial information, wherein any user has the ability to gain access to or manipulate such document processing job. As such, any user could print the document processing job containing the confidential information, thereby gaining access to information to which the user is not entitled.

Another concern for queue management in a shared document processing environment is information contained in a listing of queued jobs, themselves. For example, a pending job entitled "Job Review Report For J. Smith," communicates information from the job title itself, thus posing additional loss of confidentiality without having access to job content.

It would be desirable to have a queue management system that allows for security in both document content and job name, which allows users to access and view their own jobs, while still providing useful knowledge of queue status without knowledge as to particulars of jobs of others.

The subject application overcomes the above noted problems and provides a system and method for controlled monitoring of pending document processing operations.

SUMMARY OF THE INVENTION

In accordance with the subject application, there is provided a system and method for a controlled monitoring of pending document processing operations.

Still further, in accordance with the subject application, there is provided a system and method for secure and confidential queue management.

Still further, in accordance with the subject application, there is provided a system and method which allows users to access and view their own jobs, while still providing useful knowledge of queue status without knowledge as to particulars of jobs of others.

Still further, in accordance with the subject application, there is provided a system for controlled monitoring of pending document processing operations. The system includes receiving means adapted for receiving a plurality of electronic documents for processing in at least one associated document processor queue. Each of the plurality of electronic documents includes identification data associated therewith. The system also includes means adapted for receiving login data from an associated user and means adapted for displaying queue data representative of each of a plurality of electronic documents disposed in the queue. The queue data includes a first level of display information corresponding to electronic documents associated with received login data and a second level of display information corresponding to electronic documents not associated with received login data.

Still further, in accordance with the subject application, there is provided a method for the controlled monitoring of pending document processing operations. A plurality of electronic documents are received for processing in at least one associated document processor queue, wherein each of the plurality of electronic documents includes identification data associated therewith. Login data from an associated user is also received. Queue data representative of each of a plurality of electronic documents disposed in the queue is then displayed. The queue data includes a first level of display information corresponding to electronic documents associated with received login data and a second level of display information corresponding to electronic documents not associated with received login data.

Preferably, the first level of display information includes a descriptive name associated with each corresponding document processing operation and the second level of display information includes a non-descriptive job identifier associated with each corresponding document processing operation. In a preferred embodiment, the system and method also include the ability to receive, from the associated user, a selected, substitute descriptive name for at least one descriptive name in the first level of display information.

In one embodiment, the system and method further include the ability to selectively receive secondary processing instructions from an associated user in accordance with the level of display information.

In another embodiment, the system and method also have the ability to receive a plurality of electronic documents encrypted in accordance with at least one selected key value. Preferably, the at least one selected key value is associated with the document processor queue. Also, preferably, the selected key value expires upon an emptying of document processing operations from the queue.

Still other advantages, aspects and features of the subject application will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed a system and method for the controlled monitoring of pending document processing operations. In particular, the subject application is directed to a system and method for secure and confidential queue management. More particularly, the subject application is directed to a system and method which allows users to access and view their own jobs, while still providing useful knowledge of queue status without knowledge as to particulars of jobs of others.

Figure 1:
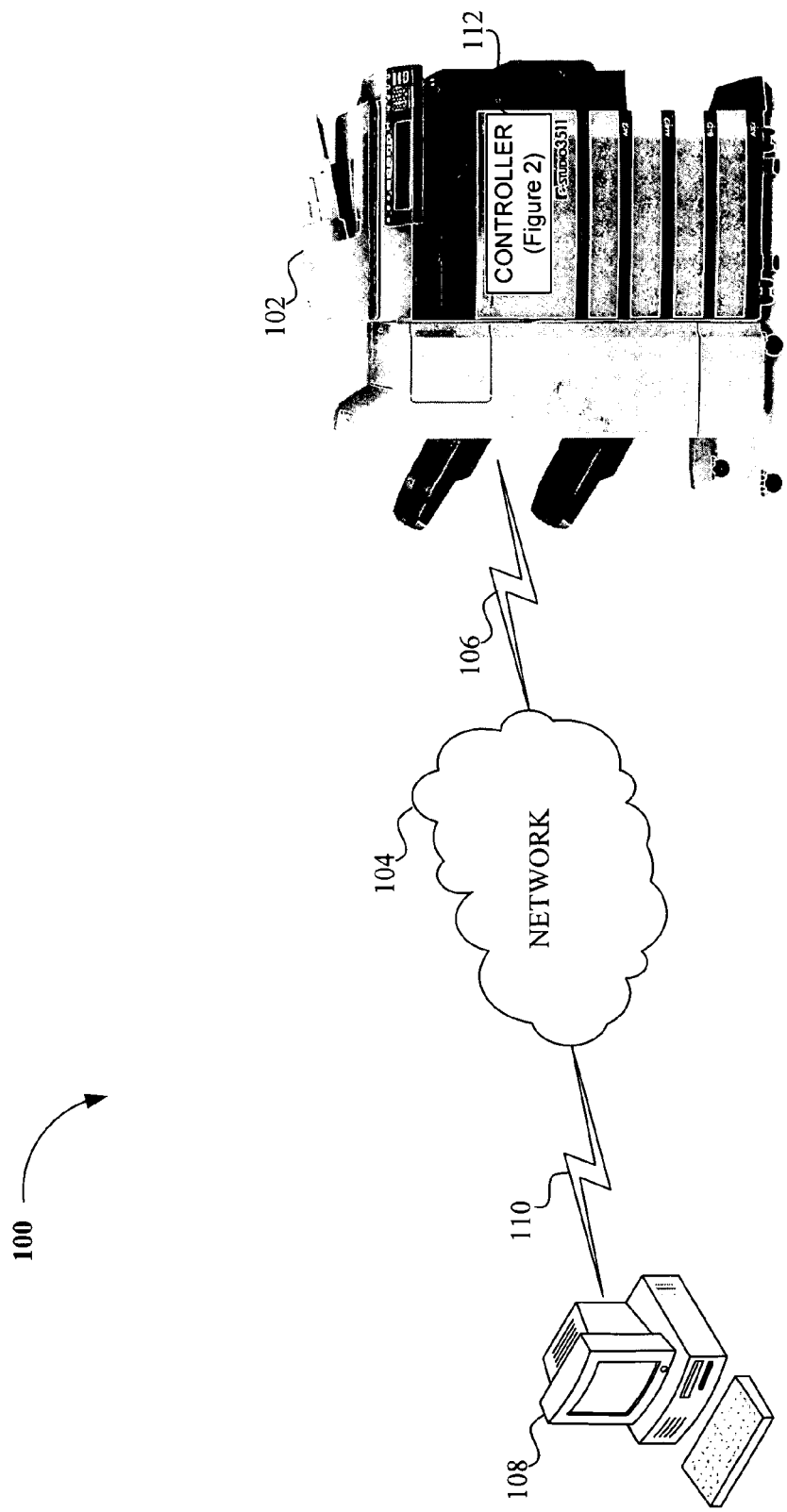
FIG. 1 which is an overall system diagram of the system for controlled monitoring of pending document processing operations according to the subject application.

Referring now to FIG. 1, there is shown a block diagram illustrating a system 100 for controlled monitoring of pending document processing operations in accordance with the subject application. As shown in FIG. 1, the system 100 includes a document processing device 102, represented as a multifunctional peripheral device. It will be understood by those skilled in the art the document processing device 102 is suitably adapted to provide a variety of document processing services, such as, for example and without limitation, electronic mail, scanning, copying, facsimile, document management, printing, and the like. Suitable commercially available document rendering devices include, but are not limited to, the Toshiba e-Studio Series Controller. In one embodiment, the document processing device 102 is suitably equipped to receive a plurality of portable storage media, including without limitation, Firewire drive, USB drive, SD, MMC, XD, Compact Flash, Memory Stick, and the like. In the preferred embodiment of the present invention, the document processing device 102 further includes an associated user-interface, such as a touch-screen interface, LCD display, or the like, via which an associated user is able to interact directly with the document processing device 102. In accordance with the preferred embodiment of the subject application, the document processing device 102 further includes memory, such as mass storage, RAM, or the like, suitably adapted to function as a queue, in which pending document processing jobs and job information is stored.

In accordance with the subject application, the document processing device 102 further incorporates a controller 112, suitably adapted to facilitate the operations of the first document processing device 102, as will be understood by those skilled in the art. Preferably, the controller 112 is embodied as hardware, software, or any suitable combination thereof, configured to control the operations of the associated document processing device 102, control the display of images via the user-interface, and the like. The functioning of the controller 112 will better be understood in conjunction with the block diagrams illustrated in FIGS. 2 and 3, explained in greater detail below.

The system 100 illustrated in FIG. 1 also includes a distributed computing environment, represented as a computer network 104. It will be appreciated that the computer network 104 is any distributed communications environment known in the art capable of allowing two or more electronic devices to exchange data. The skilled artisan will understand that the computer network 104 is any computer network, known in the art, including, for example and without limitation, a local area network, a wide area network, a personal area network, a virtual network, the Internet, or any combination thereof. In the preferred embodiment, the network 104 is comprised of physical layers and transport layers, as illustrated by a myriad of conventional data transport mechanisms, including, for example and without limitation, Ethernet, Token-Ring, 802.11(x), or other wire-based or wireless data communication mechanisms.

In accordance with one aspect of the subject application, the document processing device 102 is in data communication with the computer network 104 via a suitable communications link 106. As will be appreciated by the skilled artisan, the suitable communications links 106 employed in accordance with the present invention includes, WiMax, 802.11a, 802.11b, 802.11g, 802.11(x), Bluetooth, the public switched telephone network, a proprietary communications network, infrared, optical, or any other suitable wired or wireless data transmission communications known in the art.

The system 100 depicted in FIG. 1 further includes at least one client device 108. Preferably, the client device 108 is communicatively coupled to the computer network 104 via a suitable communications link 110. It will be appreciated by those skilled in the art that the client device 108 is depicted in FIG. 1 as a laptop computer for illustration purposes only. As the skilled artisan will understand, the client device 108 shown in FIG. 1 is representative of any personal computing device known in the art, including, for example and without limitation, a computer workstation, a personal computer, a personal data assistant, a web-enabled cellular telephone, a smart phone, or other web-enabled electronic device suitably capable of generating and/or transmitting electronic document data to a multifunctional peripheral device. Communication between the client device 108 and the computer network 104 is advantageously accomplished via the communications link 110. The communications link 110 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In the preferred embodiment, the client device 108 is suitably adapted to generate an electronic document using any document or image generating application known in the art.

Figure 2:
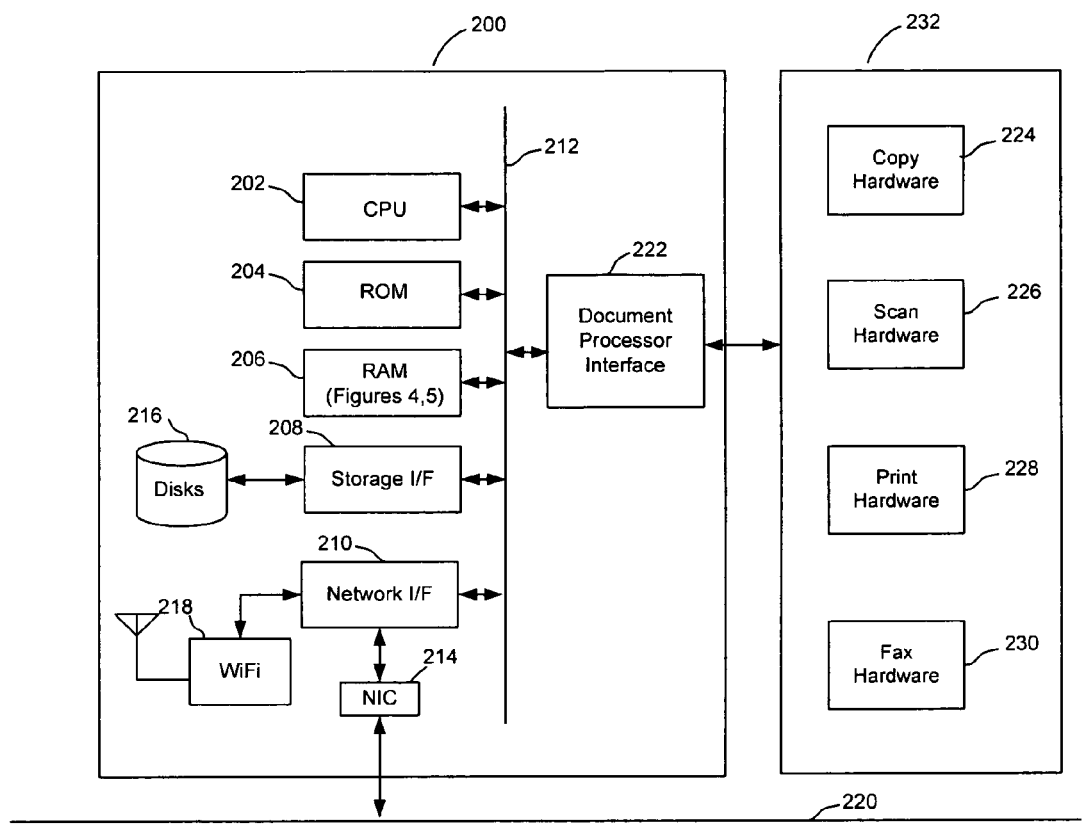
FIG. 2 is a block diagram illustrating controller hardware for use in the system for controlled monitoring of pending document processing operations according to the subject application.

Turning now to FIG. 2, illustrated is a representative architecture of a suitable controller 200, e.g., controller 112 of FIG. 1, on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
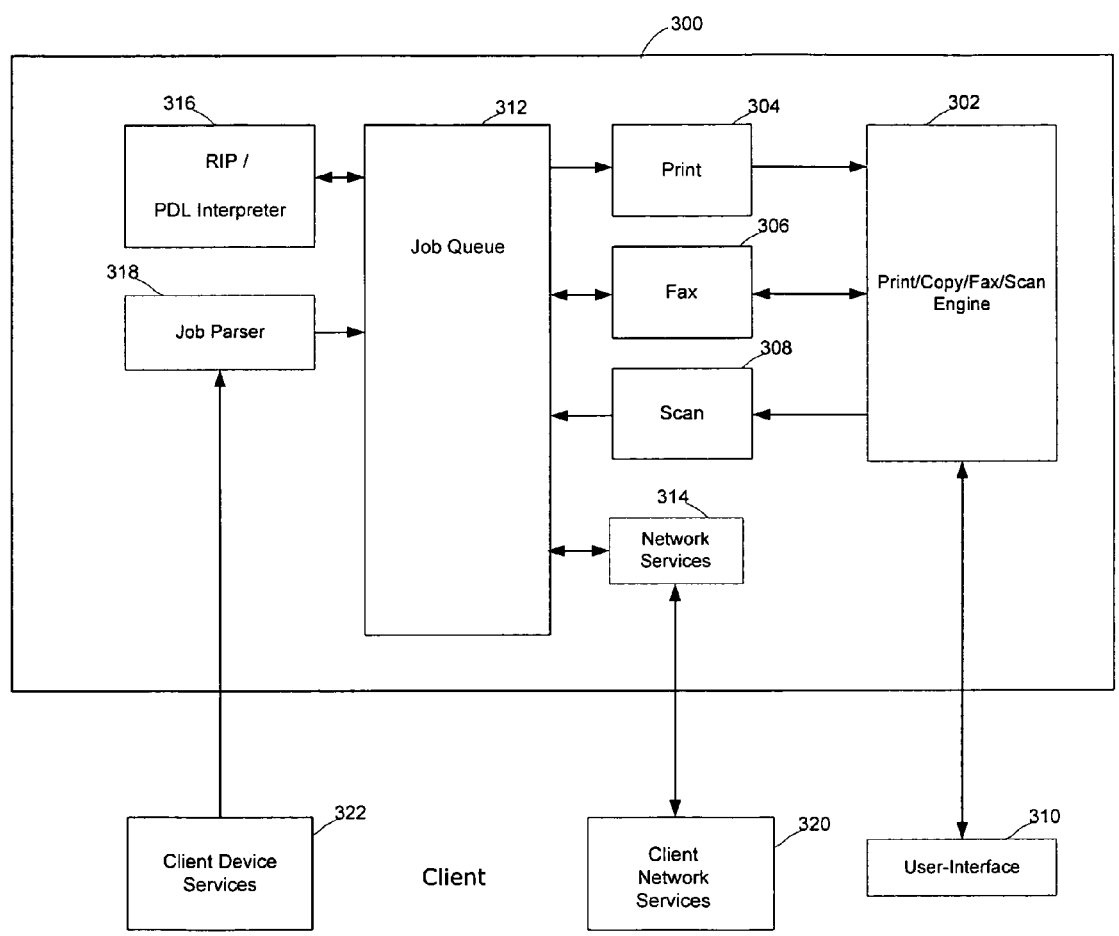
FIG. 3 is a functional block diagram illustrating the controller for use in the system for controlled monitoring of pending document processing operations according to the subject application.

Functionality of the subject system 100 is accomplished on a suitable document processing device that includes the controller 200 of FIG. 2, i.e., controller 112 of FIG. 1, as an intelligent subsystem associated with a document processing device. In the illustration of FIG. 3, controller function 300, in the preferred embodiment, includes a document processing engine 302. A suitable controller functionality is that which is incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, according to the preferred embodiment of the subject application, electronic document data is generated via any suitable means and incorporated into a document processing request, i.e., a job request. Preferably, a user associated with the client device 108 initiates a document processing request via any suitable means. The skilled artisan will appreciate that a document processing request, in accordance with the subject application, a document processing request includes, for example and without limitation, a facsimile request, a print request, a copy request, a document management request, or the like. The file to be processed, as requested by the user, is then assigned a job name, identification data, or the like, based upon the file name associated with the selected file. According to one aspect of the subject application, the user is able to specify a desired job name to be used as the job name. The skilled artisan will appreciate that the capability of selecting a desired job name enables the user to differentiate among a variety of jobs, particularly when used in conjunction with a document management system. It will further be appreciated by those skilled in the art that the entry of the desired job name is suitably accomplished via a printer driver resident on the client device 108 or other software application resident thereon.

The document processing request is then transmitted to the document processing device 102 via the computer network 104. It will be understood by those skilled in the art that a user is able to directly submit a document processing request to the document processing device 102 via the associated user-interface. A determination is then made by the controller 112 associated with the document processing device 102 whether a job information queue is currently empty, or if there are pending jobs on the document processing device 102. When this queue is empty, the controller 112 associated with the document processing device 102 generates a random static encryption key via any suitable means known in the art. It will be appreciated by the skilled artisan that when the job information queue is not empty, job information contained therein is already encrypted, in accordance with the methodology described below. Thus, it will be apparent to one skilled in the art that the job information queue already has an associated random generated static encryption key. The job information, including such data as the job name or file name, user association data, and the like, is then encrypted using the static encryption key, which results in the generation of a job identification. The encrypted job information is then added to the job information queue, thereafter identifiable by the job identification. Status associated with the pending document processing request is then updated routinely, so as to present the associated user with status information relative to the processing of the submitted job.

To monitor the pending job, a user first logs onto the document processing device 102 via any suitable means known in the art. The skilled artisan will appreciate that the subject application is capable of employing, but is not limited to, user identification and associated password, biometric data, or the like, for use as login data. In accordance with one aspect of the subject application, user information, inclusive of any user identification and associated password, is stored on the document processing device 102, or alternatively, available from an authentication authority (not shown) via the computer network 104. The controller 112 then authenticates the user supplied identification data to ascertain the identity of the user, the user's role, as well as other document processing settings and rights, as will be known in the art. Once the user has successfully logged onto the document processing device 102, the user is able to request job status information, preferably via the associated user-interface. It will be appreciated by those skilled in the art that the subject application is not limited solely to access via the user-interface associated with the document processing device 102, but is capable of allowing remote access, via the client device 108, or the like.

The controller 112 associated with the document processing device 102 then retrieves job information from the job information. In accordance with one aspect of the subject application, all jobs currently pending are displayed to the user. The skilled artisan will understand that the jobs thus displayed are only shown as job identifications, thereby preventing the user from ascertaining the content, user, file name, and the like, from the pending job list. As the user has previously provided authentication information, the controller 112 determines which of the jobs on the list are associated with the logged on user. When a job does not correspond to the user, status data, including file name, is not made available to the user, but rather the list includes the job identification, preventing the determination of the contents of the job. When a job on the list is associated with the logged on user, the controller 112 decrypts the job information using the static encryption key. This process is repeated for each job pending on the document processing device 102. Once all jobs have either been decrypted, or determined to remain encrypted, the controller 112 associated with the document processing device 102 displays the list of pending jobs to the logged on user. Those decrypted jobs associated with the user are then displayed along with status information, such as, for example and without limitation, processing progress, number of pages output, number of pages transmitted, and the like. It will be appreciated by the skilled artisan that when the user is an administrator, or a user with administrative rights or access, all job identifications are decrypted and thereby rendered viewable to the administrative user.

The subject application further enables the logged in user to modify those pending document processing jobs with which the user is associated. For example, the user is able to delete a pending job, pause a job, or the like. When the user selects a job from the list displayed, the controller 112 first determines whether the job is associated with the user. When the selected job is not associated with the logged on user, the controller 112 associated with the document processing device 102 prevents the user from modifying the job. In contrast, when the selected document processing request is associated with the logged on user, the controller 112 allows the user to delete the job, pause the job, or move the job to a higher priority of processing. The skilled artisan will appreciate that when the logged on user is an administrative user, or a user with administrative access, the user is able to modify and monitor all jobs pending on the document processing device 102. The skilled artisan will appreciate that additional embodiments are contemplated in accordance with the system 100 described above in FIGS. 1, 2, and 3, and in conjunction with the methodologies illustrated in FIG. 4 and FIG. 5.

Figure 4:
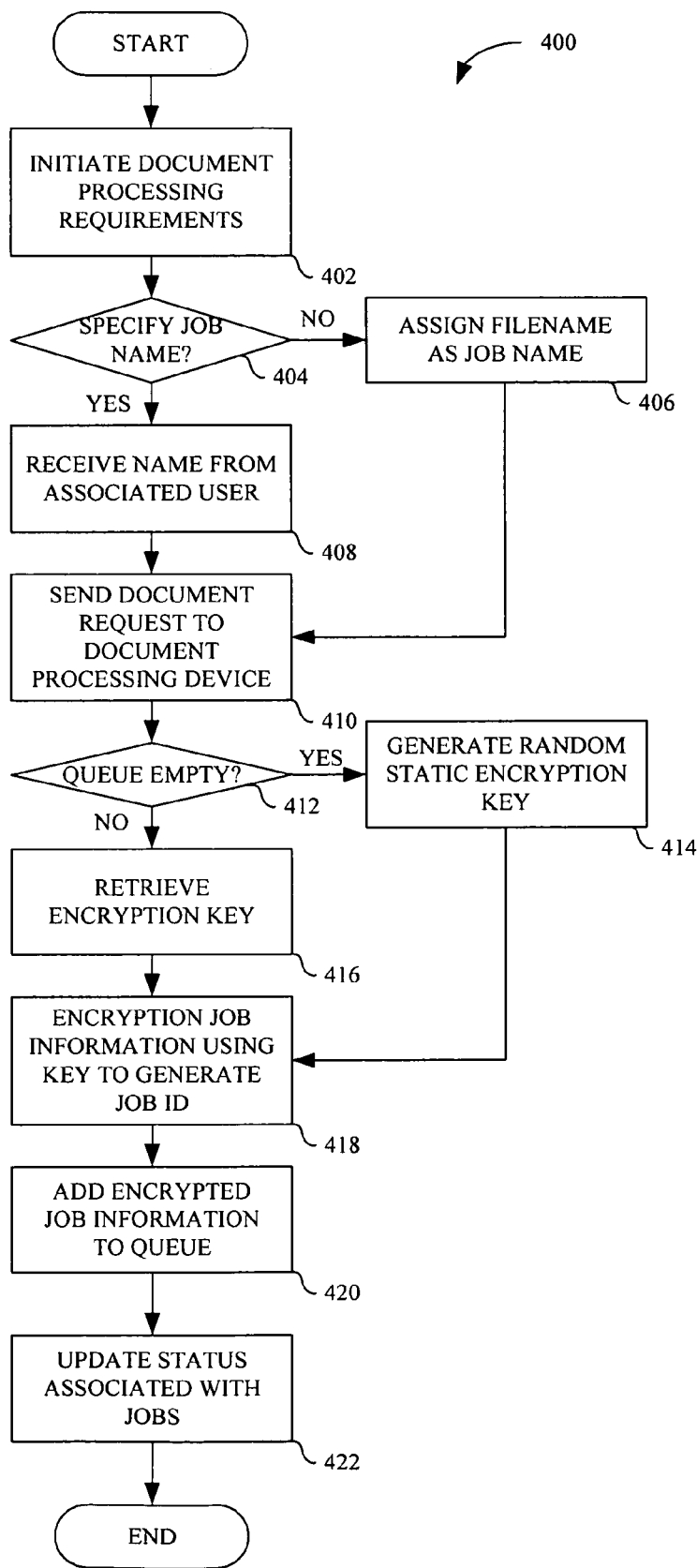
FIG. 4 is a flowchart illustrating the method for controlled monitoring of pending document processing jobs according to the subject application.

Turning now to FIG. 4, there is shown a flowchart 400 illustrating the method for controlled monitoring of pending document processing jobs in accordance with the subject application. As the skilled artisan will appreciate, the flowchart 400 depicts the methodology whereby the user submits a document processing request to the document processing device 102. Beginning at step 402, the user initiates a document processing request via any suitable means known in the art. Those skilled in the art will appreciate that a printer driver, or other software application resident on the client device 108 is capable of receiving user input of a document processing request. Furthermore, the skilled artisan will appreciate that the document processing request is capable of being initiated directly from the user-interface associated with the document processing device 102. Irrespective of the origin of the document processing request, a determination is made at step 404 whether the user desires to specify a name for the document processing request. When the user does not desire to input a particular name for the request, the filename associated with the request is assigned as the job name at step 406. When the user desires to designate a particular name for the request, the user inputs the selected name at step 408, which is then used as the job name.

The document processing request, thereafter identified by the job name, is then transmitted to the document processing device 102 at step 410. It will be understood by those skilled in the art that when the user is physically proximate to the document processing device 102, the transmittal of the request to the device 102 is suitably capable of being accomplished by specifying a network 104 location of the document associated with the request, the insertion of a portable storage medium on which the document resides, or the like. Flow then proceeds to step 412, whereupon a determination is made whether the job information queue is empty. When the queue is determined to be empty, flow proceeds to step 414, whereupon a random static encryption key is generated via any suitable means known in the art. Flow then proceeds from step 414 to step 418, whereupon the job information is encrypted using the random static encryption key, resulting in the generation of a job identification. In accordance with the preferred embodiment of the subject application, when no jobs remain in the queue, the random static encryption key is deleted. The skilled artisan will appreciate that a new random static encryption key is randomly generated when the queue is empty and the document processing device 102 receives a document processing request.

When it is determined at step 412 that the queue is not empty, flow proceeds to step 416, whereupon the encryption key associated with the queue is retrieved by the document processing device and used to encrypt the job information at step 418, resulting in a job identification. The encrypted job information is then added to the queue, identifiable by the job identification at step 420. Status information associated with the pending document processing request is then updated at step 422, reflecting the current status of the pending job.

Figure 5:
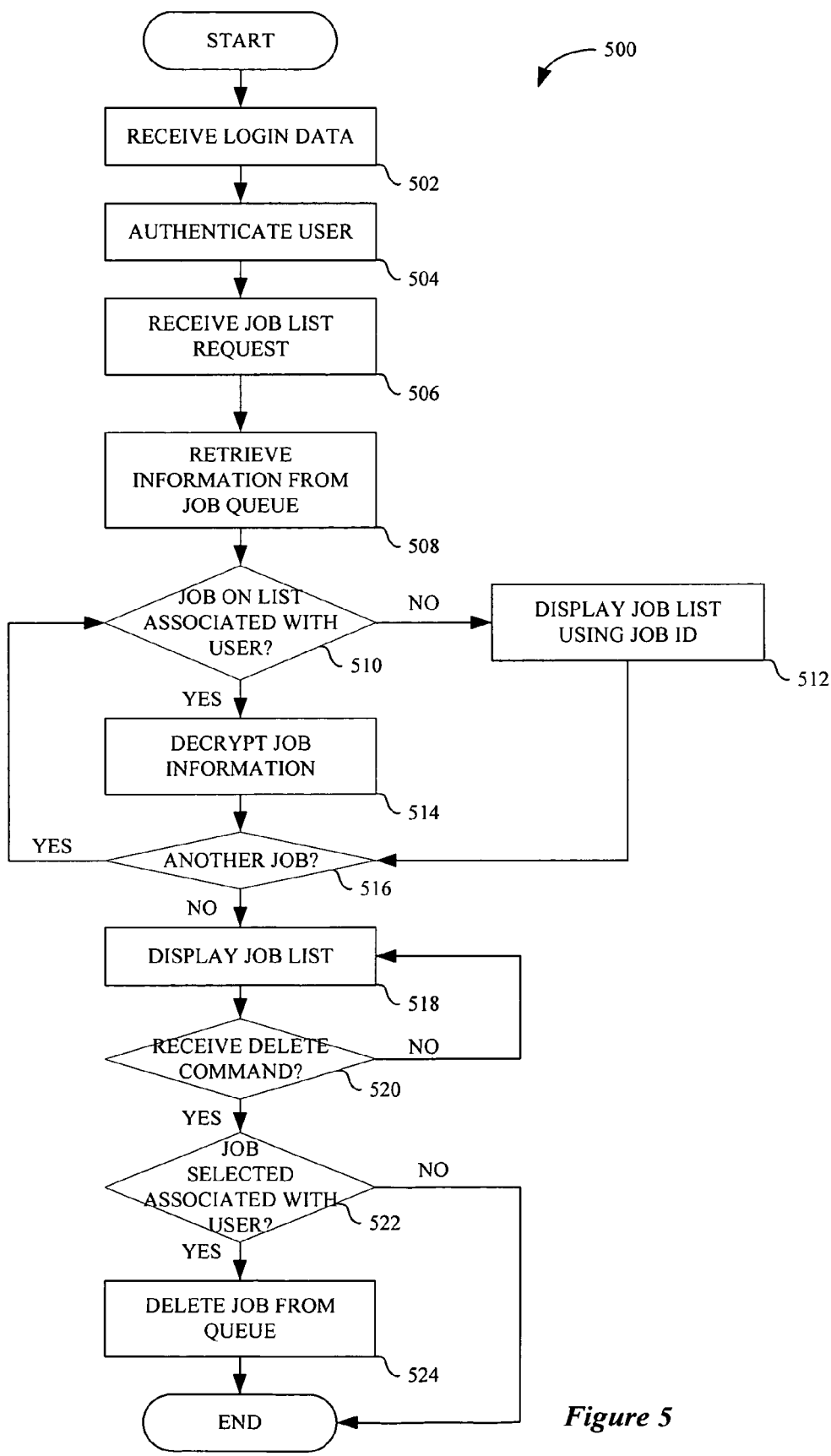
FIG. 5 is a flowchart illustrating the method for controlled monitoring of pending document processing jobs according to the subject application.

Referring now to FIG. 5, there is shown a flowchart 500 illustrating a method for controlled monitoring of pending document processing jobs in accordance with the subject application. As the skilled artisan will appreciate, the flowchart 500 depicts the methodology whereby a user monitors a document processing request pending on the document processing device 102. Beginning at step 502, the document processing device 102 receives user login data via any suitable means known in the art. In accordance with the preferred embodiment of the subject application, the user provides a user ID and password, which is submitted to the document processing device 102 via the associated user-interface, or via a suitable interface via the client device 108. At step 504, the controller 112 authenticates the user. As will be understood by those skilled in the art, the user ID and password, or other authenticating data, are verified against previously stored data at the document processing device 102, or other authenticating authority (not shown). Thus, the skilled artisan will appreciate that any suitable authentication methods, known in the art, are capable of being employed in accordance with the subject application.

Once the user has logged on and been authenticated, the user submits a job listing request, which is received by the document processing device 102 at step 506. As previously addressed, the request for job listing data is capable of originating directly at the document processing device 102, or via an electronic request submitted from the client device 108 via the computer network 104. Irrespective of the origins of the job listing request, the controller 112 associated with the document processing device 102 retrieves job information from the job information queue at step 508. It will be appreciated by those skilled in the art that at this point in the processing of the job listing request, all job information remains encrypted, thus resulting in the retrieval of job identifications only. Flow then proceeds to step 510, whereupon a determination is made whether the first job resident on the list is associated with the authenticated user. When the job is not associated with the logged on user, the controller 112 associated with the document processing device 102 determines at step 512 to display only the job identification and not any additional status information or the job name. When the job is associated with the authenticated user, flow then proceeds to step 514, whereupon the controller 112 uses the random static encryption key to decrypt the job identification, thereby resulting in decrypted job information. Flow then proceeds to step 516 for a determination whether any jobs remain on the list of pending jobs in the job information queue.

In the event that additional jobs remain, flow returns from step 516 to step 510, for a determination whether the next job is associated with the logged on user. The skilled artisan will appreciate that steps 510 through 514 continue until all jobs on the list have been reviewed. When no additional jobs remain, flow proceeds to step 518, whereupon the job list is displayed to the logged on user. It will be understood by those skilled in the art that the job list includes job information associated with those jobs corresponding to the logged on user, as well as the job identification of those jobs not associated with the logged on user. At this point, the user is then able to selectively ascertain the status associated with each job the user submitted, while being prevented from discerning any additional information regarding other jobs.

At step 520, a determination is made by the controller 112 associated with the document processing device 102 whether a deletion or other modification command has been received from the user. When no such command is received, flow returns to the display of pending jobs at step 518. When a command to modify or delete a pending job is received from the user at step 520, flow proceeds to step 522 for a determination whether the selected job is associated with the logged on user. That is, the document controller 112 determines at step 522 whether the job to be modified or deleted by the user originated from that user. When it is determined that the pending job originated from the user, the desired modification or deletion is carried out by the document processing device 102 at step 524. When the selected job is not associated with the user, operation terminates, as the user is not authorized to modify or delete jobs associated with other users. It will be appreciated by those skilled in the art that when the logged on user is authenticated as an administrator, all job identifications are decrypted and the administrative user is able to selectively modify any of the pending job requests.

The invention extends to computer programs in the form of source code, object code, code intermediate sources and partially compiled object code, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for controlled monitoring of pending document processing operations comprising:
   receiving means adapted for receiving a plurality of electronic documents for processing in at least one associated shared document processor queue associated with a document processing device, each of the plurality of electronic documents including identification data comprised of a document name associated with a document processing operation and an identifier corresponding to a submitter associated therewith;
   generating means adapted for generating a key in accordance with each receipt of an electronic document into the at least one associated document processor queue when empty;
   means adapted for modifying at least a portion of received identification data in accordance with the generated key;
   means adapted for encrypting the document name in accordance with the generated key;
   means adapted for receiving login data from an associated user; and
   means adapted for displaying queue data representative of a concurrent display of each of a plurality of electronic documents disposed in the queue, which queue data includes a first level of display information representative of decrypted identification data corresponding to a job name for each electronic document associated with received login data and a second level of display information displayed in accordance with a non-job name identifier representative of encrypted identification data corresponding to electronic documents not associated with received login data.

2. The system for controlled monitoring of pending document processing operations of claim 1 further comprising means adapted for selectively receiving secondary processing instructions from an associated user in accordance with the level of display information.

3. The system for controlled monitoring of pending document processing operations of claim 2 wherein the receiving means includes means adapted for receiving each of the plurality of electronic documents encrypted in accordance with at least one selected key.

4. The system for controlled monitoring of pending document processing operations of claim 3 wherein the at least one selected key is associated with the document processor queue.

5. The system for controlled monitoring of pending document processing operations of claim 4 wherein the selected key expires upon an emptying of document processing operations from the queue.

6. The system for controlled monitoring of pending document processing operations of claim 1 further comprising means adapted for receiving, from the associated user, a selected, substitute job name for at least one job name in the first level of display information.

7. A method for controlled monitoring of pending document processing operations comprising the steps of:
   receiving a plurality of electronic documents for processing in at least one associated shared document processor queue associated with a document processing device, each of the plurality of electronic documents including identification data comprised of a document name associated with a document processing operation and an identifier corresponding to a submitter associated therewith;
   generating a key in accordance with each receipt of an electronic document into the at least one associated document processor queue when empty;
   modifying at least a portion of received identification data in accordance with the generated key;
   encrypting the document name in accordance with the generated key;
   receiving login data from an associated user; and
   displaying queue data representative of a concurrent display of each of a plurality of electronic documents disposed in the queue, which queue data includes a first level of display information representative of decrypted identification data corresponding to a job name for each electronic document associated with received login data and a second level of display information displayed in accordance with a non-job name identifier representative of encrypted identification data corresponding to electronic documents not associated with received login data.

8. The method for controlled monitoring of pending document processing operations of claim 7 further comprising the step of selectively receiving secondary processing instructions from an associated user in accordance with the level of display information.

9. The method for controlled monitoring of pending document processing operations of claim 8 wherein the step of receiving a plurality of electronic documents for processing includes the receiving each of the plurality of electronic documents encrypted in accordance with at least one selected key.

10. The method for controlled monitoring of pending document processing operations of claim 9 wherein the at least one selected key is associated with the document processor queue.

11. The method for controlled monitoring of pending document processing operations of claim 10 wherein the selected key expires upon an emptying of document processing operations from the queue.

12. The method for controlled monitoring of pending document processing operations of claim 7 further comprising the step of receiving, from the associated user, a selected, substitute job name for at least one job name in the first level of display information.

13. A computer-implemented method for controlled monitoring of pending document processing operations comprising the steps of:
   receiving a plurality of electronic documents for processing in at least one associated shared document processor queue associated with a document processing device, each of the plurality of electronic documents including identification data comprised of a document name associated with a document processing operation and an identifier corresponding to a submitter associated therewith;
   generating a key in accordance with each receipt of an electronic document into the at least one associated document processor queue when empty;
   modifying at least a portion of received identification data in accordance with the generated key;
   encrypting the document name in accordance with the generated key;
   receiving login data from an associated user; and
   displaying queue data representative of a concurrent display of each of a plurality of electronic documents disposed in the queue, which queue data includes a first level of display information representative of decrypted identification data corresponding to a job name for each electronic document associated with received login data and a second level of display information displayed in accordance with a non-job name identifier representative of encrypted identification data corresponding to electronic documents not associated with received login data.

14. The computer-implemented method for controlled monitoring of pending document processing operations of claim 13 further comprising the step of selectively receiving secondary processing instructions from an associated user in accordance with the level of display information.

15. The computer-implemented method for controlled monitoring of pending document processing operations of claim 14 wherein the step of receiving a plurality of electronic documents for processing includes the receiving each of the plurality of electronic documents encrypted in accordance with at least one selected key.

16. The computer-implemented method for controlled monitoring of pending document processing operations of claim 15 wherein the at least one selected key is associated with the document processor queue.

17. The computer-implemented method for controlled monitoring of pending document processing operations of claim 16 wherein the selected key expires upon an emptying of document processing operations from the queue.

18. A system for controlled monitoring of pending document processing operations comprising:
an input operable for receiving a plurality of electronic documents for processing in at least one associated shared document processor queue associated with a document processing device, each of the plurality of electronic documents including identification data comprised of a document name associated with a document processing operation and an identifier corresponding to a submitter associated therewith;
a processor operable for generating a key in accordance with each receipt of an electronic document into the at least one associated document processor queue when empty;
the processor further operable for modifying at least a portion of received identification data inclusive of the document name in accordance with the generated key;
the processor further operable for encrypting the document name in accordance with the generated key;
an input operable for receiving login data from an associated user; and
the processor further operable for displaying queue data representative of a concurrent display of each of a plurality of electronic documents disposed in the queue, which queue data includes a first level of display information representative of decrypted identification data corresponding to a job name for each electronic document associated with received login data and a second level of display information displayed in accordance with a non-job name identifier representative of encrypted identification data corresponding to electronic documents not associated with received login data.

19. The system for controlled monitoring of pending document processing operations of claim 18 further comprising an input operable for selectively receiving secondary processing instructions from an associated user in accordance with the level of display information.

20. The system for controlled monitoring of pending document processing operations of claim 19 further comprising an input operable for receiving each of the plurality of electronic documents encrypted in accordance with at least one selected key.

21. The system for controlled monitoring of pending document processing operations of claim 20 wherein the at least one selected key is associated with the document processor queue.

22. The system for controlled monitoring of pending document processing operations of claim 21 wherein the selected key expires upon an emptying of document processing operations from the queue.

23. The system for controlled monitoring of pending document processing operations of claim 18 further comprising an input operable for receiving, from the associated user, a selected, substitute job name for at least one job name in the first level of display information.

* * * * *